United States Patent
Morisada

(10) Patent No.: US 7,024,284 B2
(45) Date of Patent: Apr. 4, 2006

(54) ANTI-VIBRATION TECHNIQUE

(75) Inventor: Masahiro Morisada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/987,029

(22) Filed: Nov. 15, 2004

(65) Prior Publication Data

US 2005/0119795 A1 Jun. 2, 2005

(30) Foreign Application Priority Data

Nov. 17, 2003 (JP) .............................. 2003/386349

(51) Int. Cl.
*G01M 1/38* (2006.01)

(52) U.S. Cl. .................... 700/280; 700/176; 248/638; 355/72

(58) Field of Classification Search ................ 700/280, 700/213, 176, 121; 248/550, 638; 702/56; 355/53, 72, 73

See application file for complete search history.

(56) References Cited

U.S. PATENT DOCUMENTS

| 5,936,710 | A | 8/1999 | Itoh et al. .................... 355/53 |
| 6,036,162 | A * | 3/2000 | Hayashi ...................... 700/280 |
| 6,160,612 | A | 12/2000 | Itoh et al. .................... 355/53 |
| 6,864,962 | B1 | 3/2005 | Morisada ...................... 355/73 |
| 2002/0080339 | A1 * | 6/2002 | Takahashi .................... 355/72 |
| 2002/0148975 | A1 * | 10/2002 | Kimba et al. .............. 250/492.1 |
| 2003/0147062 | A1 | 8/2003 | Morisada ..................... 355/72 |
| 2003/0164930 | A1 | 9/2003 | Morisada ..................... 355/53 |
| 2003/0197845 | A1 | 10/2003 | Morisada ..................... 355/53 |

FOREIGN PATENT DOCUMENTS

| JP | 6-137371 | 5/1994 |
| JP | 10-281215 | 10/1998 |

\* cited by examiner

*Primary Examiner*—Jayprakash N. Gandhi
*Assistant Examiner*—Charles Kasenge
(74) *Attorney, Agent, or Firm*—Fitzpatrick, Cella, Harper & Scinto

(57) ABSTRACT

An anti-vibration system includes a supporting member for supporting a driving mechanism, an acceleration sensor for detecting acceleration of the supporting member, a driving unit for driving the supporting member, a storing unit for memorizing offset data to be used for offsetting an output of the acceleration sensor, an offset unit for offsetting an output of the acceleration sensor in accordance with the offset data memorized in the storing unit, a control unit for producing a driving signal in relation to the driving unit, on the basis of an output of the offset unit, a renewing unit for renewing the offset data during a non-driving period of the driving mechanism, on the basis of an output of the acceleration sensor, a discrimination unit for discriminating whether the offset data should be renewed or not, during the non-driving period of the driving mechanism, on the basis of an output of the acceleration sensor, in which the renewing unit renews the offset data in response to an affirmative discrimination result of the discrimination unit, in which the discrimination unit performs discrimination again to the offset data renewed by the renewing unit to verify the offset data, and a notifying unit for notifying disorder provided that a negative discrimination result is not obtained after the discrimination is made a predetermined number of times by the discrimination unit.

9 Claims, 7 Drawing Sheets

ANTI-VIBRATION TECHNIQUE

FIELD OF THE INVENTION AND RELATED ART

This invention relates to an anti-vibration technique particularly effectively usable in exposure apparatuses, for example.

In semiconductor exposure apparatuses, generally, an X-Y stage is mounted on an anti-vibration system. Such an anti-vibration system includes a type in which vibration is attenuated by use of vibration absorbing means such as an air spring, a coiled spring or a vibration isolating rubber, and a type wherein vibration is actively cancelled by driving an actuator such as a voice coil motor. In recent years, in order to avoid deterioration of the positioning precision of the X-Y stage to meet further reduction in size of circuit patterns, active vibration cancellation has been used widely. The anti-vibration system based on active vibration cancellation uses acceleration sensors as sensor means for detecting the vibration.

As regards such acceleration sensors, it is possible that the offset voltage (offset component in an output signal, and hereinafter this will be referred to as "offset" or an "offset value") may change with time for a while after the anti-vibration system is assembled or installed in the factory. If such an offset voltage is present, an unwanted input as well will be applied to the actuator, and in some cases the offset voltage becomes large and the acceleration value grows beyond the reproducible range of an A/D converter. In consideration of this, conventionally, the offset is checked again before shipment. Alternatively, an average of time-series signals concerning acceleration signals may be detected and the difference between a latest acceleration signal and the average may be calculated to remove a DC component (Japanese Laid-Open Patent Application, Publication No. 6-137371). As a further alternative, whether a low-frequency driving signal for driving a pneumatic actuator has reached a predetermined level or more may be detected to thereby detect malfunction of an acceleration sensor (Japanese Laid-Open Patent Application, Publication No. 10-281215).

However, even if adjustment for checking the offset again is carried out before shipment, this could not meet the possibility that the offset voltage is variable after installment. Further, the offset removing method based on detection of an average of time-series signals of acceleration signals described above is not easy to perform because acceleration of a base table can be produced in various patterns due to the reaction force of the stage driving force. On the other hand, the acceleration sensor malfunction detecting method based on detecting whether the low-frequency driving signal reaches a predetermined level described above is suitable only to a system having two types of actuators, that is, an electromagnetic actuator and a pneumatic actuator.

SUMMARY OF THE INVENTION

It is accordingly an object of the present invention to provide an anti-vibration technique by which at least one of the inconveniences described above can be removed or reduced.

It is another object of the present invention to make it possible to appropriately renew offset data of an acceleration sensor that detects acceleration of a supporting member for supporting a driving mechanism.

In accordance with an aspect of the present invention, to achieve at least one of the objects described above, there is provided an anti-vibration system, comprising a supporting member for supporting a driving mechanism, an acceleration sensor for detecting acceleration of said supporting member, a driving unit for driving said supporting member, a storing unit for memorizing offset data to be used for offsetting an output of said acceleration sensor, an offset unit for offsetting an output of said acceleration sensor in accordance with the offset data memorized in said storing unit, a control unit for producing a driving signal in relation to said driving unit, on the basis of an output of said offset unit, and a renewing unit for renewing the offset data during a non-driving period of the driving mechanism, on the basis of an output of said acceleration sensor.

In accordance with another aspect of the present invention, there is provided an offset data renewing method to be used with an anti-vibration system that includes (i) a supporting member for supporting a driving mechanism, (ii) an acceleration sensor for detecting acceleration of the supporting member, (iii) a driving unit for driving the supporting member, (iv) a storing unit for memorizing offset data to be used for offsetting an output of the acceleration sensor, (v) an offset unit for offsetting an output of the acceleration sensor in accordance with the offset data memorized in the storing unit, and (vi) a control unit for producing a driving signal in relation to the driving unit, on the basis of an output of the offset unit, the improvements residing in the steps of: discriminating whether the offset data should be renewed or not, during the non-driving period of the driving mechanism, on the basis of an output of the acceleration sensor; and renewing the offset data during a non-driving period of the driving mechanism, on the basis of an affirmative discrimination result obtained in the discriminating step.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Figure 1:
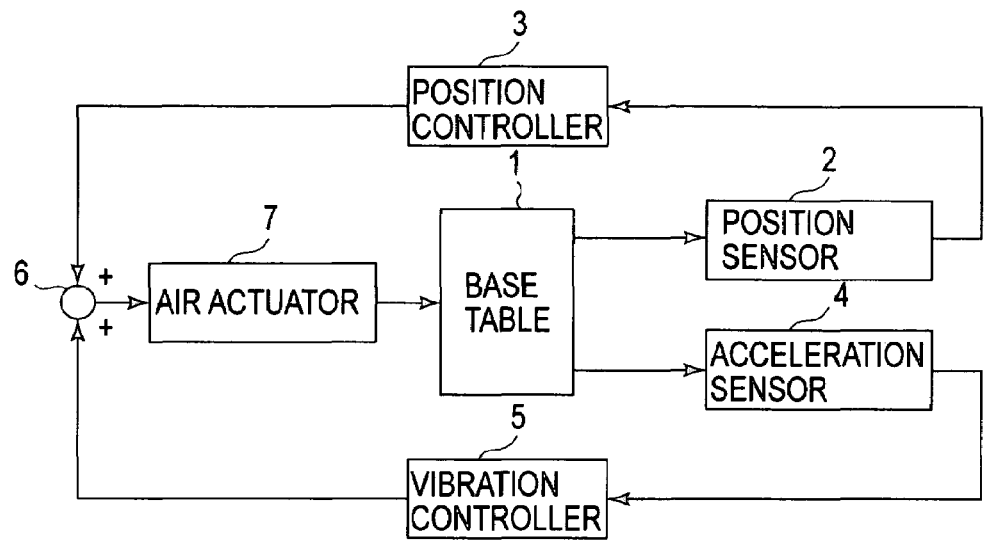
FIG. 1 is a block diagram for explaining the structure of an anti-vibration system according to an embodiment of the present invention.

FIG. 1 illustrates the structure of an anti-vibration system according to an embodiment of the present invention. Denoted in the drawing at 1 is a base table on which an X-Y stage for positioning a substrate to be exposed, in a semiconductor exposure apparatus, is mounted. Denoted at 2 is a position sensor for measuring the position of the base table 1, and denoted at 3 is a position controller for producing a driving signal on the basis of the measurement result of the position sensor 2. Denoted at 4 is an acceleration sensor for measuring acceleration of the base table 1, and denoted at 5 is a vibration controller for producing a driving signal on the basis of an acceleration value to be obtained by subtracting an offset value from the output of the acceleration sensor 4. Denoted at 6 is an adder for adding outputs of the position controller 3 and the vibration controller 5, and outputting a drive command on the basis of it. Denoted at 7 is an actuator for driving the base table 1 on the basis of the drive command from the adding circuit 6.

The position controller 3 operates to calculate a position drive command necessary for the base table 1 to follow a target position, on the basis of the result of position measurement made by the position sensor 2. The position controller then outputs a corresponding drive signal for the actuator 7. Generally, in many cases, the position controller 3 is provided by a PI controller. The vibration controller 5 calculates a vibration drive command (a command for attenuating the vibration) effective to avoid vibration of the base table 1, on the basis of an acceleration value that can be obtained by subtracting an offset value from the measured acceleration of the base table 1, measured by the acceleration sensor 4. The vibration controller then outputs a corresponding drive signal for the actuator 7. Since the actuator 7 has an integration characteristic, as regards the vibration controller 5, generally and in may cases, one that can apply a proportional gain is used. The calculation of a drive command in the position controller 3 and the vibration controller 5 may be carried out by use of predetermined software, in a CPU 9 of FIG. 2 to be described below.

Figure 2:
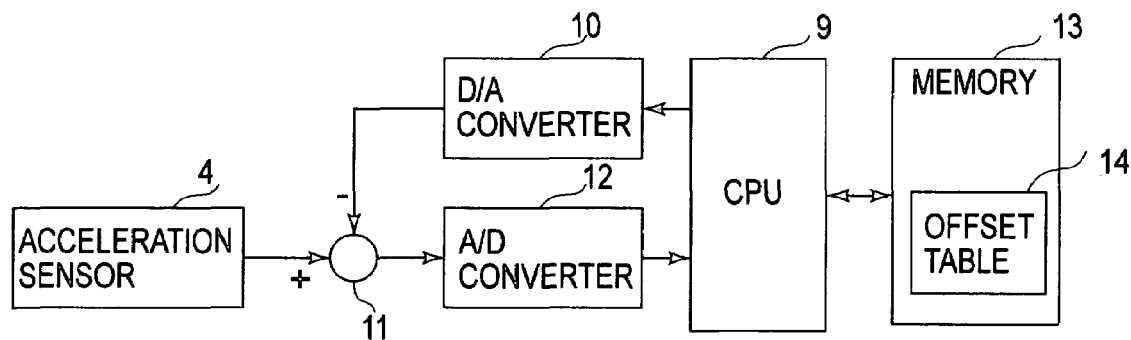
FIG. 2 is a block diagram for explaining offset adjusting means in the anti-vibration system of FIG. 1.

FIG. 2 illustrates the structure of offset adjusting means for canceling offset voltage of the acceleration sensor 4. Denoted in FIG. 2 at 9 is a CPU, and denoted at 10 is a D/A converter for converting an output of the CPU 9 into an analog value. Denoted at 11 is an adder for subtracting an output of the D/A converter 10 from an output of the acceleration sensor 4 and for outputting the result. Denoted at 12 is an A/D converter for converting an output of the adder 11 into a digital value and for applying the same to the CPU 9. Denoted at 13 is a memory to which the CPU 9 is accessible. Denoted at 14 is an offset table prepared inside the memory 13.

The offset table 14 stores therein an offset set value for canceling an offset attributable to a mounting error, or the like, of the acceleration sensor 4. The CPU 9 reads out the offset set value from the offset table 14, and produces and outputs an offset voltage through the D/A converter 10. The adder 11 has a function for providing an output corresponding to a difference between this offset voltage and an acceleration measured value from the acceleration sensor 4. This output of the adder is applied as an acceleration value to the CPU 9 through the A/D converter 12.

With this circuitry, the offset of the acceleration sensor, which is attributable to the mount error, or the like, thereof and which is variable with time, can be cancelled by the offset value in the offset table 14. As regards the offset set value, the initial value thereof may be set at zero or any other appropriate value, and it may be determined by calculating an average value of measured values of the acceleration sensor 4 in a predetermined period.

Figure 3A:
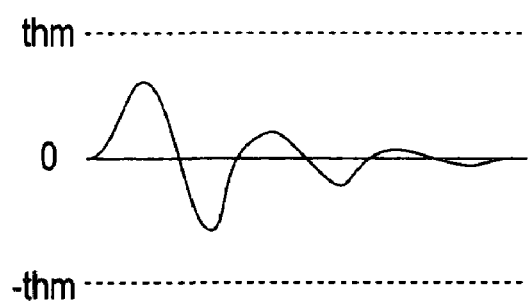
FIGS. 3A and 3B are waveform views, respectively, each illustrating a waveform of an acceleration value at the time of a floating start of a base table.
Figure 3B:
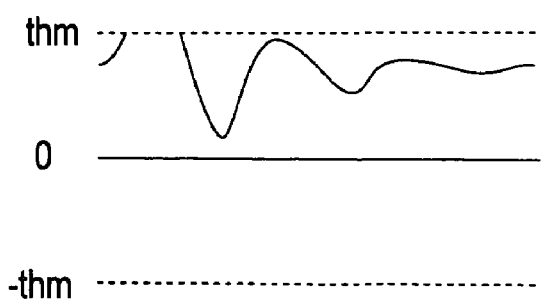

FIG. 3A illustrates a waveform of an acceleration value as the base table 1 is just floated in the state in which the offset of the acceleration sensor 4 is cancelled correctly. However, in some acceleration sensors, it is possible that the offset voltage thereof varies for a while after being assembled into an anti-vibration system or after being installed in the factory. For example, if the offset voltage becomes large and the acceleration value grows to exceed the reproducible range ("–thm" to "thm") of the A/D converter 12, as shown in FIG. 3B, accurate acceleration value is no longer obtainable.

Figure 4:
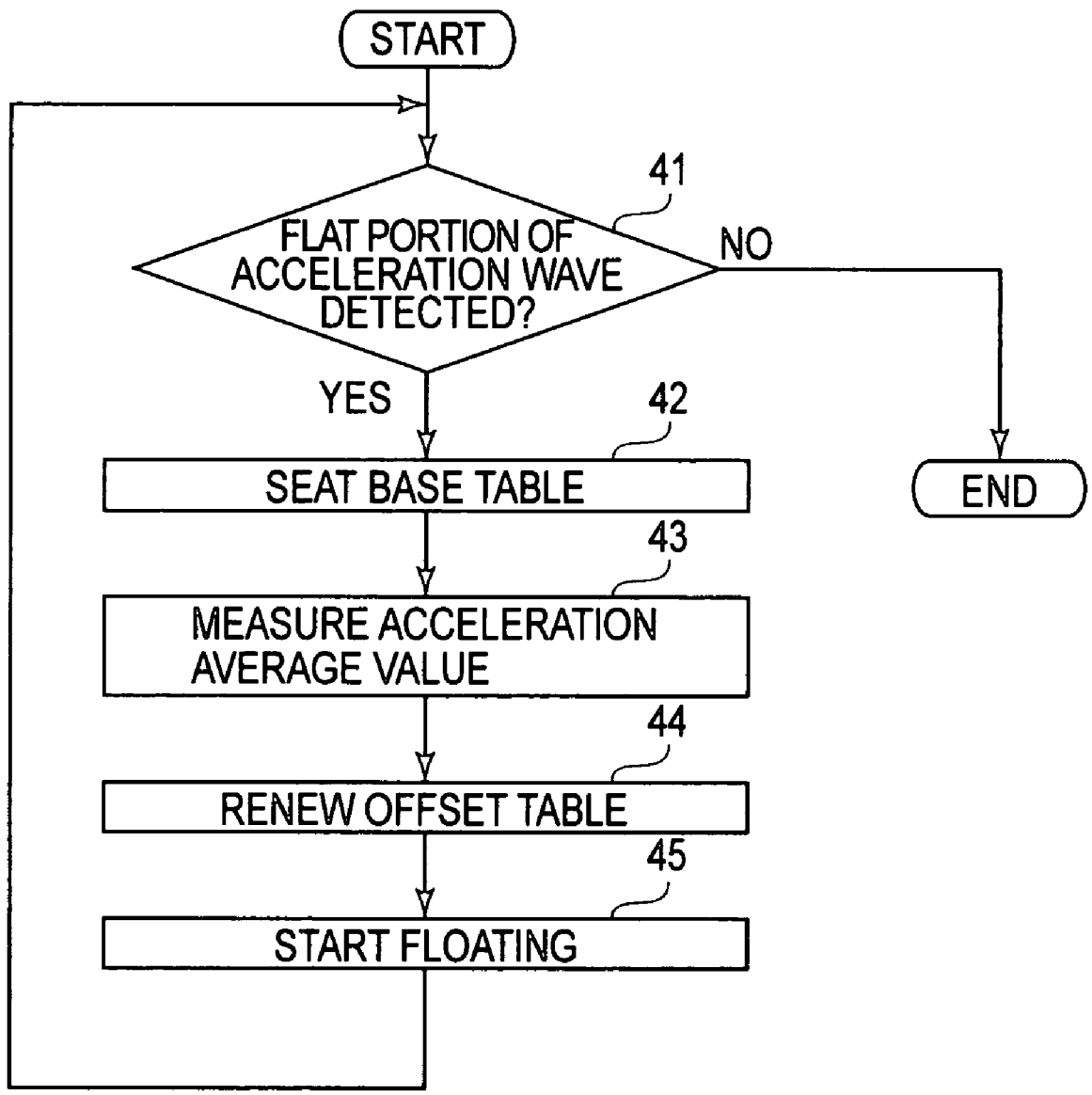
FIG. 4 is a flow chart for explaining an offset value renewing procedure in the anti-vibration system of FIG. 1.

FIG. 4 illustrates the procedure of offset renewal, being effective to solve this problem. The offset renewing process is carried out as the base table 1 is floated, by means of vibration controller 5 or CPU 9. As the process starts, first, at step 41, the waveform of an acceleration signal outputted from the adder 11 is observed while the base table 11 is being floated, and a discrimination is made as to whether the time period in which the acceleration value is equal to the upper limit "thm" or the lower limit "–thm" of the reproducible range is longer than a predetermined time period or not. If the result of the discrimination shows that the time period is not longer than the predetermined time, since it means that offset cancellation has been made correctly, an offset renewing process is finished. If, on the other hand, the time period is discriminated as being longer than the predetermined time, since it means that offset cancellation has not been made correctly and the acceleration value is not correct, at step 42, the base table is seated. Then, at step 43, an average of acceleration values in a predetermined period is calculated.

Subsequently, at step 44, on the basis of the thus calculated average value, a new offset set value is stored into the offset table 14. Then, at step 45, the base table floating is initiated again, and the sequence goes back to step 41. The above-described procedure is repeated until an abnormality of the acceleration value is extinguished. However, if the number of repetitions reaches a predetermined number, occurrence of hardware disorder may be displayed and notified to an operator, and the offset renewing process may be discontinued.

Figure 5:
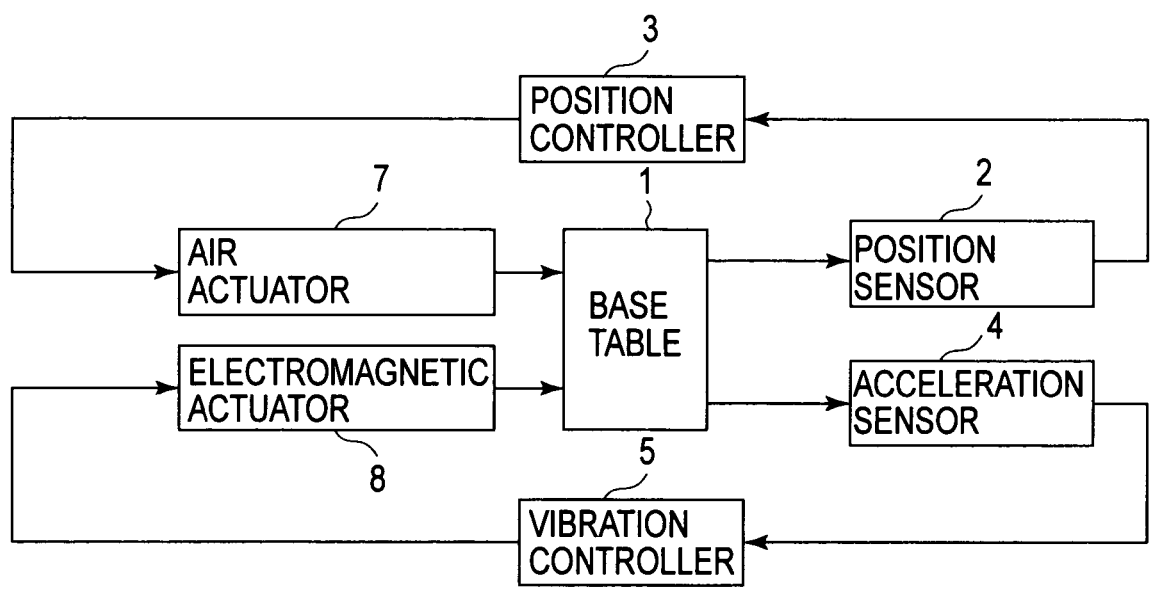
FIG. 5 is a block diagram for explaining the structure of an anti-vibration system according to another embodiment of the present invention.

FIG. 5 illustrates the structure of an anti-vibration system according to another embodiment of the present invention. Elements corresponding to those of FIG. 1 are denoted by like numerals. In FIG. 5, denoted at 8 is an electromagnetic actuator for driving a base table 1. The offset voltage of an acceleration sensor 4 can be cancelled by similar offset adjusting means such as shown in FIG. 2. In this embodiment, vibration of the base table 1 is suppressed by means of electromagnetic actuator 8. More specifically, acceleration of the base table 1 is measured by the acceleration sensor 4, and it is applied to a vibration controller 5. The vibration controller 5 calculates a vibration drive command (a command for attenuating the vibration) effective to avoid vibration of the base table 1, and it applies that vibration drive command to the electromagnetic actuator 8.

Here, for applying damping to the control characteristic of the base table 1, generally, and in many cases, an integrator or a pseudo integrator is used as the vibration controller 5. The calculation of a drive command in the position controller 3 and the vibration controller 5 may be carried out by use of predetermined software, in the CPU 9 of FIG. 2, for example.

Figure 6:
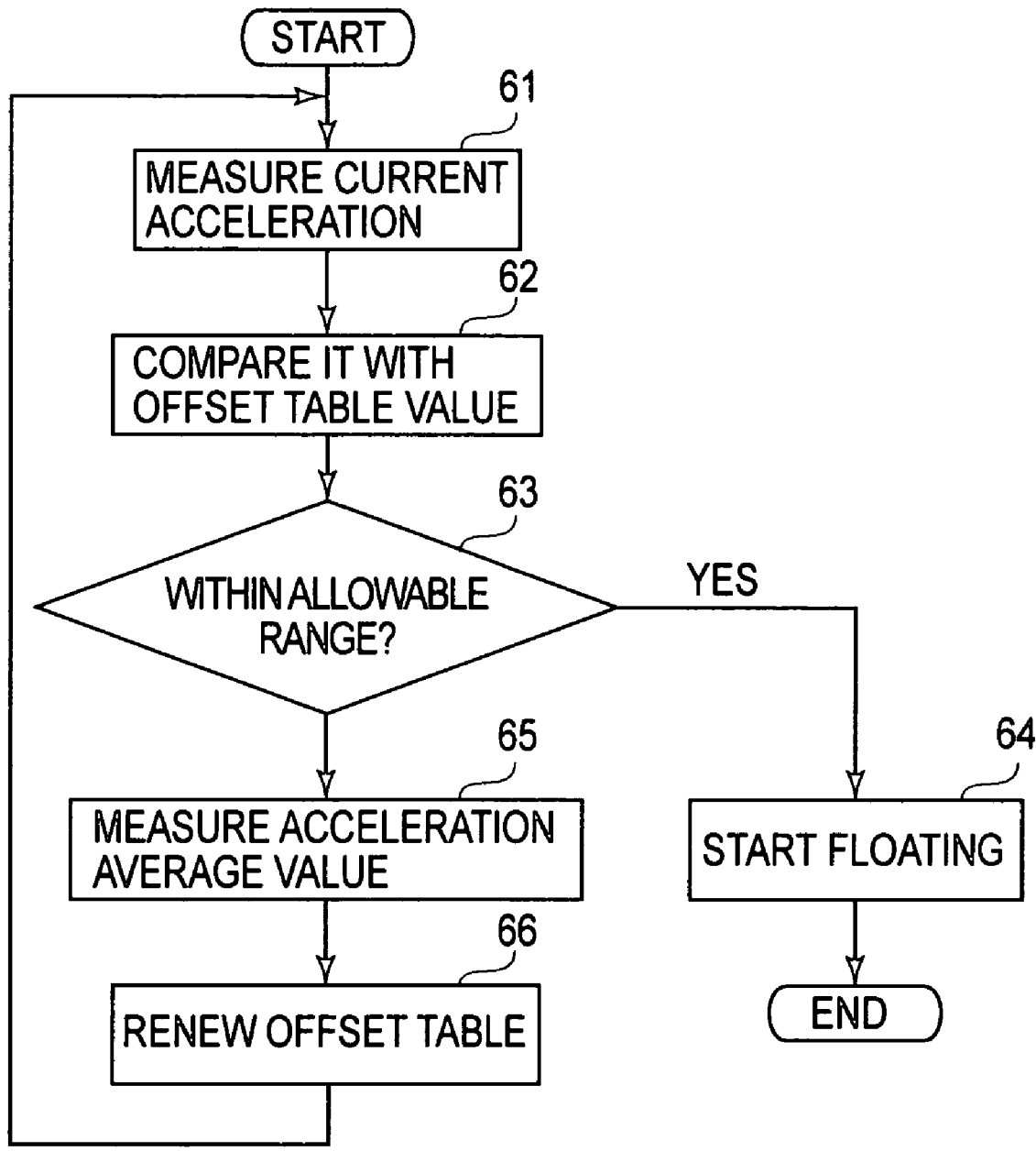
FIG. 6 is a flow chart for explaining an offset value renewing procedure in the anti-vibration system of FIG. 5.

FIG. 6 is a flow chart for explaining an offset renewing process according to this embodiment, which should be carried out each time the base table 1 is going to be floated (before the floating). This offset renewing process is carried out by means of a vibration controller 5 or CPU 9. As the processor starts, first at step 61 a current output value of the acceleration sensor 4 is measured. Subsequently, at step 62, the measured output value is compared with an offset set value in the offset table 14, and a discrimination is made as to whether the difference between them is within a predetermined allowable range or not. If the discrimination result shows that the difference is within the allowable range, the sequence goes up to step 64 where the floating of the stage 1 is initiated and the offset renewing process is finished. If the discrimination result shows that the difference is beyond the allowable range, the sequence goes to step 65, and an average of acceleration values in a predetermined period is calculated.

Subsequently, at step 66, on the basis of the thus calculated average value, a new offset set value is stored into the offset table 14. Then, the sequence goes back to step 61. The above-described procedure is repeated until the acceleration value comes into the allowable range. However, if the number of repetitions reaches a predetermined number, occurrence of hardware disorder may be displayed and notified to an operator, and the offset renewing process may be discontinued.

In this embodiment, the offset renewing process is carried out before starting the floating of base table 1. In place of this, as in the preceding embodiment, the process may be carried out in the state that the base table 1 is being floated at a steady position and the stage supported by the base table 1 is held stationary (i.e., not being driven).

The present invention is not limited to the embodiments described above, and it can be modified appropriately. For example, the criteria for discriminating whether the offset renewing process should be initiated or not is not limited to the one described above. It may be one that includes at least the former of the output of the acceleration sensor 4 and the offset value. Furthermore, while the offset measuring and renewing process is carried out while the base table is being seated, it may be carried out while the base table is being floated. Moreover, although in the embodiments described above, the number of actuators is not specified, it may be one or more. Generally, actuators are mounted on a supporting leg of the base table. If there are three supporting legs extending in a vertical direction, regarding the base-table position control system, a three-axis control system may be provided, including a Z-axis (vertical driving axis) translational control system, a rotational control system about the X-axis, and a rotational control system about the Y-axis. This is also the case with the vibration control system.

As regards the supporting legs for supporting the base table, they are not limited to vertical ones. Supporting legs adapted to drive the base table in a horizontal direction may be mounted. For example, by providing an air spring in a horizontal direction, swinging motion of the base table in the horizontal direction can be suppressed effectively. Alternatively, electromagnetic actuators for driving the base table in a horizontal direction may be mounted.

Furthermore, the present invention is effectively applicable even to a case wherein a plurality of stages are mounted on a base table or to a case wherein there is canceling means (called a "countermass") for canceling a drive reaction force of a stage on the base table by applying a drive in a direction opposite to the movement direction of the stage.

Figure 7:
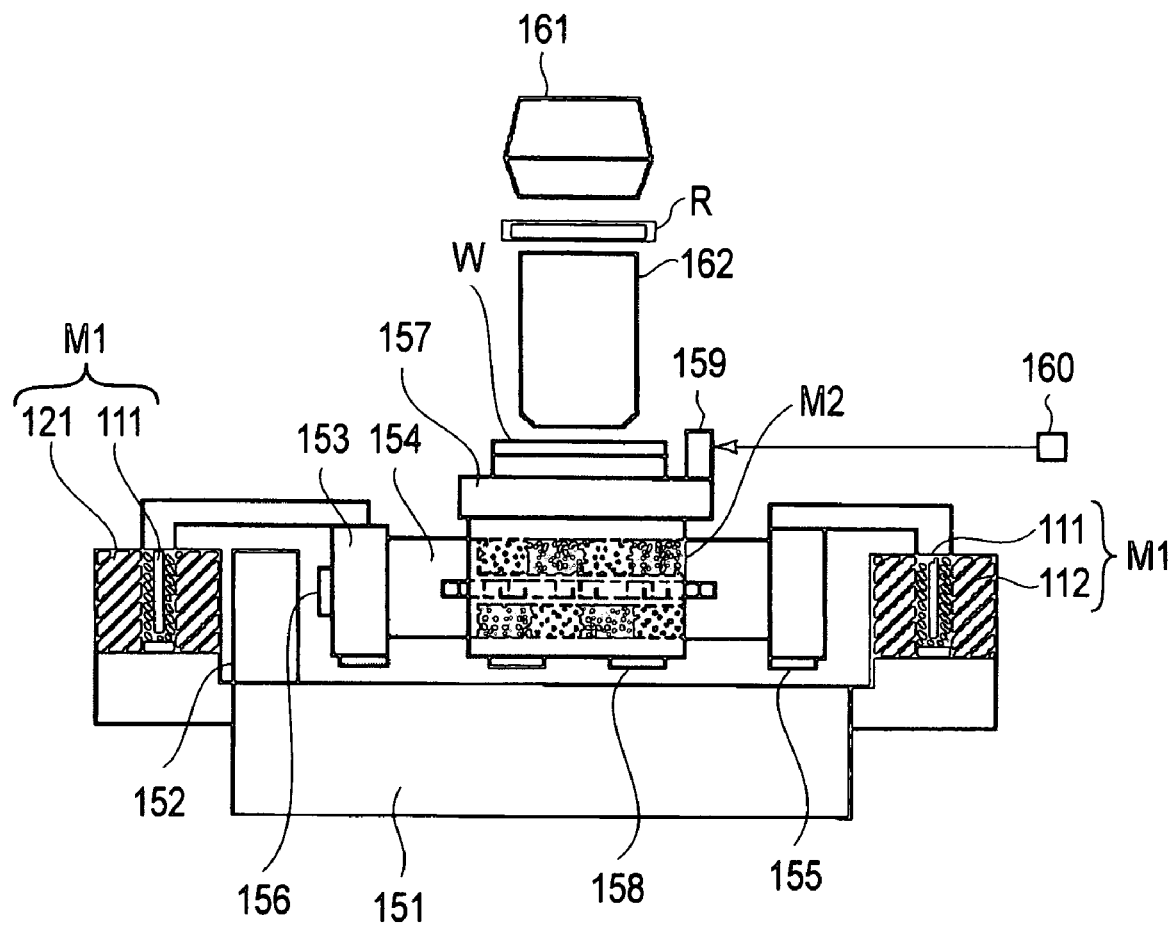
FIG. 7 is a schematic view of an exposure apparatus to which the present invention can be applied.

FIG. 7 shows an exposure apparatus for device manufacture, into which an anti-vibration system such as described above, is incorporated.

This exposure apparatus is to be used for the manufacture of microdevices having a fine pattern formed thereon, such as semiconductor devices (semiconductor integrated circuits, for example), micromachines, or thin-film magnetic heads, for example. In this exposure apparatus, exposure light (which may include visible light, ultraviolet light, EUV light, X-rays, an electron beam, and a charged particle beam, for example) as exposure energy supplied from a light source 161 illuminates a reticle R (original), and light from the reticle R is projected onto a semiconductor wafer W (substrate) through a projection system having a projection lens 162 (which may include a refractive lens, a reflective lens, a catadioptric lens system, and a charged particle lens, for example), whereby a desired pattern is produced on the substrate.

The exposure apparatus includes a base table 151 having a guide 152 and a linear motor stator 121 fixed thereto. The linear motor stator 121 has a multiple-phase electromagnetic coil, while a linear motor movable element 111 includes a permanent magnet group. The linear motor movable portion 111 is connected as a movable portion 153 to a movable guide 154 (stage), and through the drive of the linear motor M1, the movable guide 154 can be moved in a direction of a normal to the sheet of the drawing. The movable portion 153 is supported by a static bearing 155, taking the upper surface of the base table 151 as a reference, and also by a static bearing 156, taking the side surface of the guide 152 as a reference.

A movable stage 157, which is a stage member disposed to straddle the movable guide 154, is supported by a static bearing 158. This movable stage 157 is driven by a similar linear motor M2, so that the movable stage 157 moves leftwardly and rightwardly as viewed in the drawings, while taking the movable guide 154 as a reference. The motion of the movable stage 157 is measured by means of an interferometer 160 and a mirror 159, which is fixed to the movable stage 157.

A wafer (substrate) W is held on a chuck which is mounted on the movable stage 157, and a pattern of the reticle R is transferred in a reduced scale onto different regions on the wafer W by means of the light source 61 and the projection optical system 162, in accordance with a step-and-repeat method or a step-and-scan method.

It should be noted that the substrate attracting device described hereinbefore can be similarly applied also to an exposure apparatus in which, without using a mask, a circuit pattern is directly drawn on a semiconductor wafer to expose a resist thereon.

Next, an embodiment of a device manufacturing method, which uses an exposure apparatus described above, will be explained.

Figure 8:
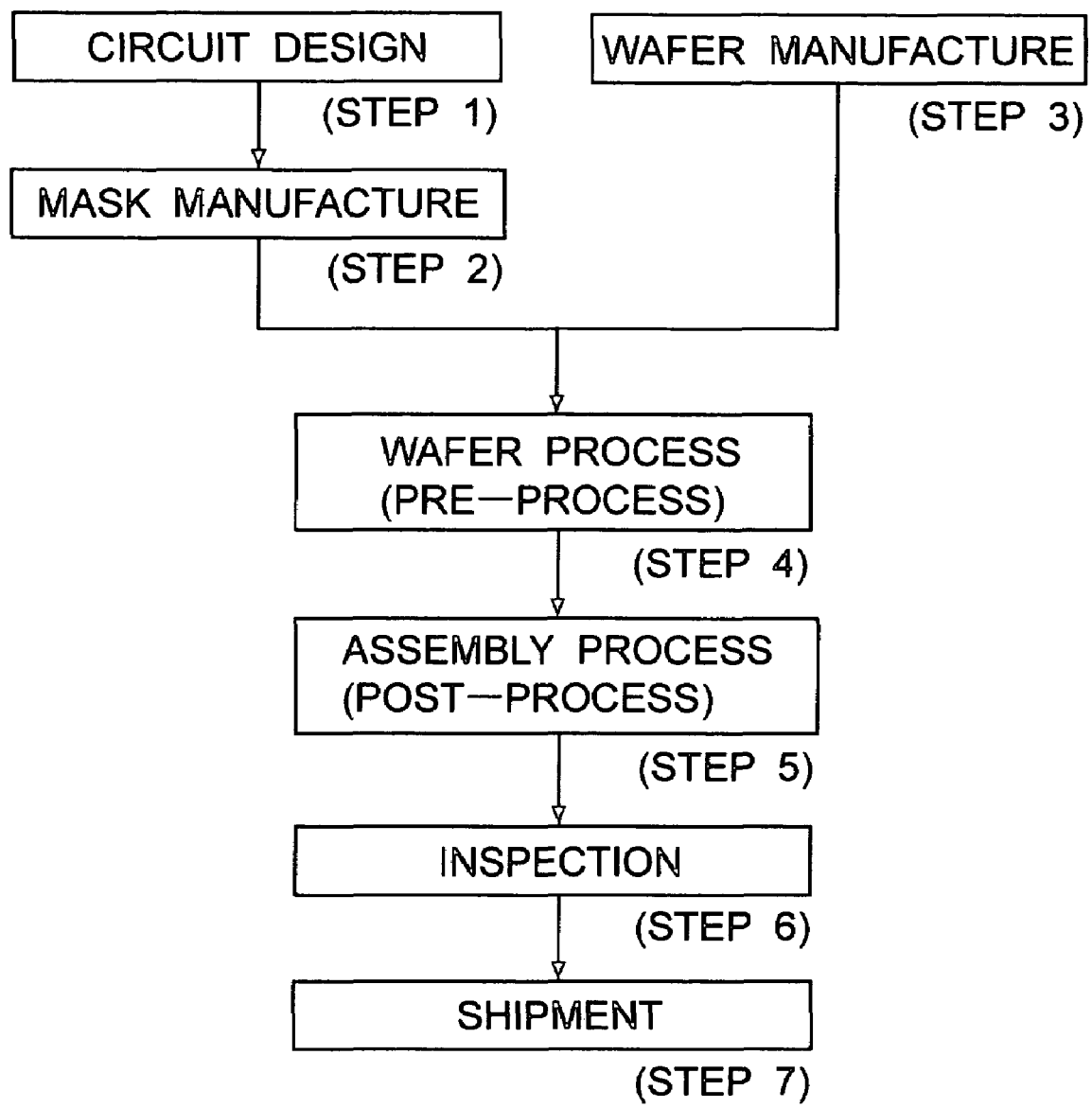
FIG. 8 is a flow chart for explaining the procedure of device manufacturing processes.

FIG. 8 is a flow chart for explaining the overall procedure for semiconductor manufacture. Step 1 is a design process for designing a circuit of a semiconductor device. Step 2 is a process for making a mask on the basis of the circuit pattern design. Step 3 is a process for preparing a wafer by using a material such as silicon. Step 4 is a wafer process, which is called a pre-process, wherein, by using the thus prepared mask and wafer, a circuit is formed on the wafer in practice, in accordance with lithography. Step 5, subsequent to this, is an assembling step, which is called a post-process, wherein the wafer having been processed at step 4 is formed into semiconductor chips. This step includes an assembling (dicing and bonding) process and a packaging (chip sealing)

process. Step 6 is an inspection step wherein an operation check, a durability check and so on, for the semiconductor devices produced by step 5, are carried out. With these processes, semiconductor devices are produced, and they are shipped (step 7).

More specifically, the wafer process at step 4 described above includes: (i) an oxidation process for oxidizing the surface of wafer; (ii) a CVD process for forming an insulating film on the wafer surface; (iii) an electrode forming process for forming electrodes upon the wafer by vapor deposition; (iv) an ion implanting process for implanting ions to the wafer; (v) a resist process for applying a resist (photosensitive material) to the wafer; (vi) an exposure process for printing, by exposure, the circuit pattern of the mask on the wafer through the exposure apparatus described above; (vii) a developing process for developing the exposed wafer; (viii) an etching process for removing portions other than the developed resist image; and (ix) a resist separation process for separating the resist material remaining on the wafer after being subjected to the etching process. By repeating these processes, circuit patterns are superposedly formed on the wafer.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2003-386349 filed Nov. 17, 2003, which is hereby incorporated by reference.

What is claimed is:

1. An anti-vibration system, comprising:
a supporting member for supporting a driving mechanism;
an acceleration sensor for detecting acceleration of said supporting member;
a driving unit for driving said supporting member;
a storing unit for memorizing offset data to be used for offsetting an output of said acceleration sensor;
an offset unit for offsetting an output of said acceleration sensor in accordance with the offset data memorized in said storing unit;
a control unit for producing a driving signal in relation to said driving unit, on the basis of an output of said offset unit;
a renewing unit for renewing the offset data during a non-driving period of the driving mechanism, on the basis of an output of said acceleration sensor;
a discrimination unit for discriminating whether the offset data should be renewed or not, during the non-driving period of the driving mechanism, on the basis of an output of said acceleration sensor, wherein said renewing unit renews the offset data in response to an affirmative discrimination result of said discrimination unit, and said discrimination unit performs discrimination again to the offset data renewed by said renewing unit to verify the offset data; and
a notifying unit for notifying disorder provided that a negative discrimination result is not obtained after the discrimination is made a predetermined number of times by said discrimination unit.

2. An anti-vibration system according to claim 1, wherein said discrimination unit performs the discrimination on the basis of data obtained by offsetting an output of said acceleration sensor with the offset data.

3. An anti-vibration system according to claim 1, wherein said discrimination unit performs the discrimination on the basis of an output of said acceleration sensor and the offset data.

4. In an exposure apparatus for exposing a substrate to a pattern, the improvements residing in the precision of an anti-vibration system as recited in claim 1.

5. An apparatus according to claim 4, further comprising a driving unit as said driving mechanism, for driving at least one of a stage for holding the substrate and a stage for holding an original having the pattern.

6. A device manufacturing method, comprising the steps of:
exposing a substrate to a pattern by use of an exposure apparatus as recited in claim 4; and
developing the exposed substrate.

7. In an offset data renewing method to be used with an anti-vibration system that includes (i) a supporting member for supporting a driving mechanism, (ii) an acceleration sensor for detecting acceleration of the supporting member, (iii) a driving unit for driving the supporting member, (iv) a storing unit for memorizing offset data to be used for offsetting an output of the acceleration sensor, (v) an offset unit for offsetting an output of the acceleration sensor in accordance with the offset data memorized in the storing unit, and (vi) a control unit for producing a driving signal in relation to the driving unit, on the basis of an output of the offset unit, the improvements residing in the steps of:
discriminating whether the offset data should be renewed or not, during the non-driving period of the driving mechanism, on the basis of an output of the acceleration sensor;
renewing the offset data during a non-driving period of the driving mechanism, on the basis of an affirmative discrimination result obtained in said discriminating step, wherein said discriminating step is carried out again to the offset data renewed in said renewing step, to verify the offset data; and
a notifying step for notifying disorder provided that a negative discrimination result is not obtained after said discriminating step is carried out a predetermined number of times.

8. A method according to claim 7, wherein, in said discriminating step, the discrimination is performed on the basis of data obtained by offsetting an output of the acceleration sensor with the offset data.

9. A method according to claim 7, wherein, in said discrimination step, the discrimination is performed on the basis of an output of the acceleration sensor and the offset data.

* * * * *

UNITED STATES PATENT AND TRADEMARK OFFICE
CERTIFICATE OF CORRECTION

PATENT NO. : 7,024,284 B2
APPLICATION NO. : 10/987029
DATED : April 4, 2006
INVENTOR(S) : Masahiro Morisada It is certified that error appears in the above-identified patent and that said Letters Patent is hereby corrected as shown below:

Col. 3, line 34, may should read many

Col.8 line 12, improvements should read improvement – and precision should read provision Signed and Sealed this Seventeenth Day of October, 2006

JON W. DUDAS
*Director of the United States Patent and Trademark Office*